Dec. 8, 1959 S. H. M. DODINGTON 2,916,614
PULSE TRANSMITTING AND RECEIVING SYSTEM
USING A COMMON SOURCE OF OSCILLATIONS
Filed June 1, 1955
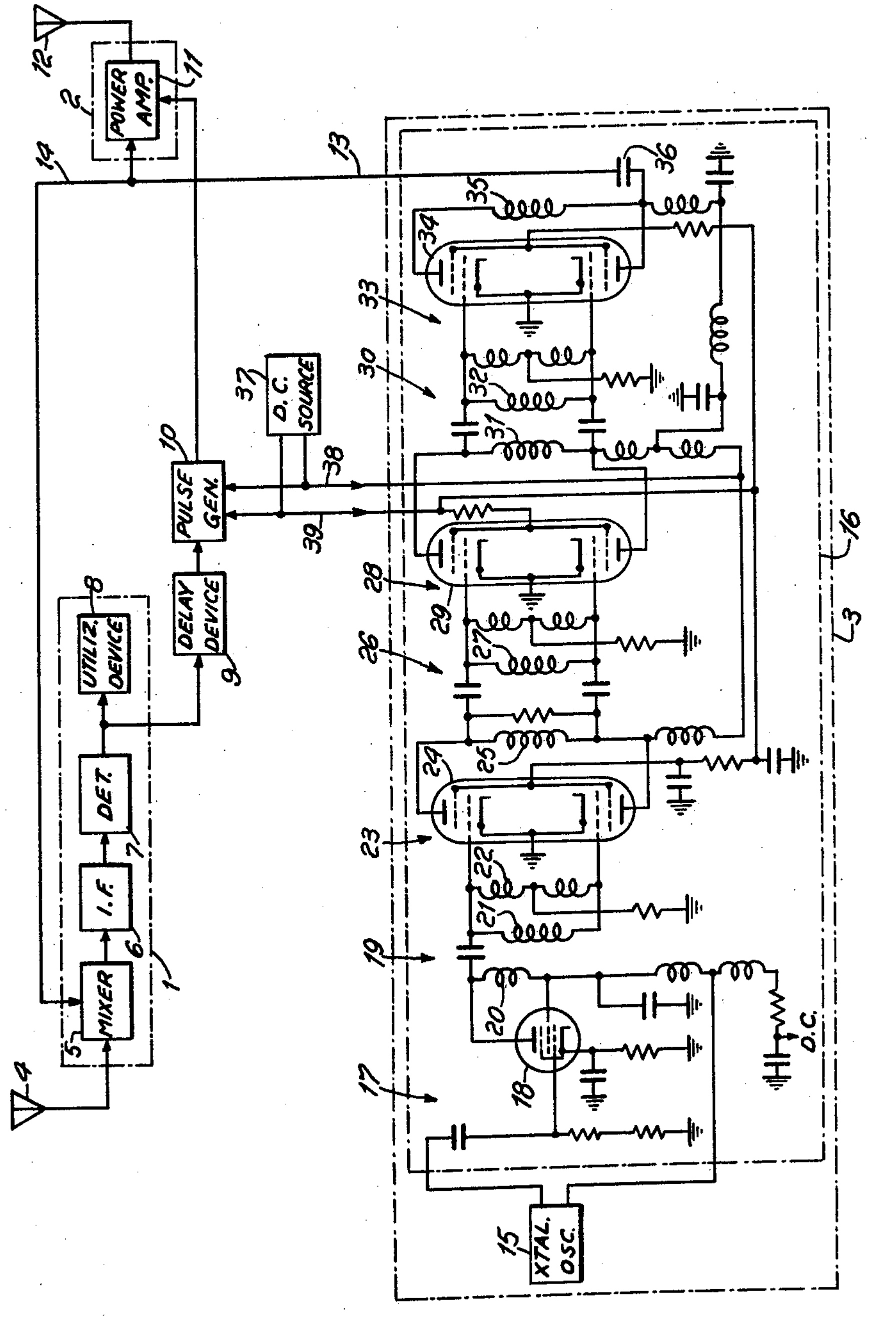
INVENTOR
SVEN H. M. DODINGTON
BY Philip M. Bolton
ATTORNEY United States Patent Office 2,916,614
Patented Dec. 8, 1959

2,916,614

PULSE TRANSMITTING AND RECEIVING SYSTEM USING A COMMON SOURCE OF OSCILLATIONS

Sven H. M. Dodington, Nutley, N.J., assignor to International Telephone and Telegraph Corporation, Nutley, N.J., a corporation of Maryland Application June 1, 1955, Serial No. 512,407

7 Claims. (Cl. 250—15)

The invention relates to a system in which a common source of oscillations is used to provide radio frequency energy for a pulsed R.F. transmitter and local oscillations for the mixer of a receiver.

In many systems a pulsed R.F. transmitter is associated with a receiver. For example, in pulse repeater links a pulse is received at one location and is then fed, usually in amplified and regenerated form, to a pulsed R.F. transmitter for transmission to another station. Other systems using receivers associated with pulsed R.F. transmitters include transponders and interrogators. In many such systems a super-heterodyne receiver is employed having a mixer which is fed with local oscillations, and in such systems it often becomes feasible to choose the intermediate frequency so that the R.F. frequency of the transmitted pulses differs from the R.F. frequency of the received signal by a frequency equal to that of the intermediate frequency.

An object of the present invention is the provision in such systems of a common source of oscillations to provide the radio frequency energy for the pulsed R.F. transmitter and the local oscillations for the mixer.

Certain difficulties are inherent in the attempt to use a common source of oscillations for feeding both a mixer and a pulsed R.F. transmitter. In the pulsed R.F. transmitter it is desirable that the source of R.F. oscillations provide relatively high power to operate, for example, a power amplifier of the transmitter. On the other hand the mixer requires little power. High power would be inefficient and would tend to burn out or damage the mixer. In addition, it is undesirable to depend solely on high level keying of the power amplifier of the transmitter for pulsing the R.F. since this would put an unnecessary burden on the equipment, requiring larger equipment with high keying voltages, and, furthermore, both "jitter" and frequency shifting would be more likely to be produced than if lower level keying were additionally employed.

Another object of the present invention is the provision of a system in which a single source of oscillations is used to feed a mixer at a low level and provide the R.F. for the power amplifier of the transmitter at a substantially higher level.

A further object is the provision of additional low level keying of the radio frequency energy supplied to the transmitter.

In carrying out the foregoing objects of the present invention, the source of local oscillations is arranged to normally produce a low level continuous wave R.F. output which is fed to the mixer. To provide the high power output for the transmitter, this source of oscillations is keyed, at a relatively low level, in synchronism with the keying of the pulse amplifier of the transmitter.

In accordance with a further aspect of the present invention the source of local oscillations consists of a source of local oscillations of the fundamental frequency, which may be a crystal oscillator, which feeds a frequency multiplier, preferably one having a plurality of stages. The output of the multiplier is normally at a low level and feeds the mixer and power amplifier of the transmitter at this level. At the time when the transmitter is to transmit pulses, the multiplier is keyed simultaneously with the pulse power amplifier to provide the high output from the multiplier desired for transmission. If the pulsing is done in a low duty cycle, the higher power momentarily fed during pulsing to the mixer will be insufficient to damage it and is, because of the low duty cycle, not likely to interfere materially with any pulses being received. In keying the multiplier in cases where the multiplier is of several stages, it is in accordance with a further aspect of the present invention arranged to apply keying pulses additional to the normal D.C. pulses to several stages of the multiplier. The fundamental oscillator is not keyed, and therefore its output tends to be very stable in frequency and thereby tends to stabilize the entire system.

Other and further objects of the present invention will become apparent, and the foregoing will be better understood with reference to the following description of an embodiment thereof, reference being had to the drawing, in which the figure is a schematic and block diagram of an electrical pulse repeater system (such as, for example, a transponder).

Referring to the figure, the pulse repeater system there disclosed consists broadly of a receiver 1, a transmitter 2, and a common source of local oscillations 3. The receiver is adapted to receive R.F. pulses on an antenna 4 which feeds a mixer 5 where the signal is mixed with local oscillations from this source 3 to produce an intermediate frequency 6 which is then detected in a detector 7 whose output may then be fed to a suitable utilization device 8. Where the system is a transponder it may be desirable to delay the pulse in some suitable delay device 9 before utilizing it to key a pulse generator 10 whose output is, in turn, used to pulse the power amplifier 11 in the transmitter 2 which feeds the transmitting antenna 12. The pulse generator 10 may produce pulses according to a code so that the transmitter may be identified. Likewise, the incoming signal may be in the form of a code of pulses which is recognized by suitable means (not shown) after the detector, the group of pulses forming the code, as usual in such transponders, producing only a single keying pulse which is applied to key the pulse generator 10. In the absence of keying pulses applied to the power amplifier 11 no output is produced; when keying pulses are applied to the power amplifier 11, the amplifier responds to the radio frequency oscillations transmitted thereto over line 13 from source 3 to produce pulsed R.F. signals. The relationship between the intermediate frequency and the R.F. local oscillations applied to amplifier 11 over line 13 and applied to the mixer over line 14 is such that this intermediate frequency is equal to the difference between the frequency of the received energy applied to the input of mixer 5 and the output frequency of the oscillations of source 3.

The mixer 5 requires only a low level input from source 3 such as, for example, of the order of 10 milliwatts, while for satisfactory operation the power amplifier requires an R.F. input of the order of 500 milliwatts. Normally, the output of source 3 is of the order of 10 milliwatts, but as will be described hereinafter, said source 3 is pulsed simultaneously with the power amplifier 11 so that it produces during the pulse periods an output of the order of 500 milliwatts. To continuously produce a high level output of the order of 500 milliwatts from source 3 would both be a strain on the equipment, or require relatively large equipment, and would likewise tend to damage the mixer 5, especially if a crystal were employed for mixing. Obviously, it would be extremely inefficient. By using the pulsing technique hereinafter described, relatively small equipment is required, and the mixer will not be damaged since if the pulse duty cycle is small the average power would tend to be low, and for a low duty cycle in the example given, below 20 watts.

The source 3 consists of a stable crystal oscillator 15, which supplies the fundamental frequency and is not pulsed. The output of the oscillator is fed to a frequency multiplier, generally designated by the numeral 16, consisting of a plurality of stages some of which are tripler stages and some of which are amplifier stages. The first stage consists of a tripler 17 using a single pentode tube 18 whose output is fed via a coupling arrangement 19 including slug-tuned coils 20 and 21, and a balancing network 22 to a push-pull amplifier 23 including a double tetrode 24. The plate circuits of the double tetrode 24 are coupled via slug-tuned coil 25 forming part of a coupling network 26 including slug-tuned coil 27 to a push-pull tripler stage 28 having a double tetrode 29. The output of tripler stage 28 is then coupled by coupling network 30 in slug-tuned coil 31 and slug-tuned coil 32 to a push-pull amplifier 33 including a double tetrode 34 whose output circuit is tuned by slug-tuned coil 35 to produce a single-ended output at condenser 36 which is connected via lines 13 and 14 to power amplifier 11 and mixer 5, respectively.

The operating voltages for the multiplier are provided as follows. A D.C. source 37 applies at terminals 38 and 39 low level D.C. operating voltages for the anodes and screen grids, respectively, such as, for example, 120 volts for the anodes and 30 volts for the screens. These voltages are applied to each of stages 23, 28 and 33, that is, to each of the push-pull amplifiers and to the push-pull tripler. Thus, terminal 39 is connected to the screens of both halves of the double tetrodes 24, 29 and 34 (via separating resistances) while terminal 38 is connected to both anodes of each of the double tetrodes 24, 29 and 34 (via conventional choke coils). During the pulsing periods, that is, when pulses are being produced by pulse generator 10, pulses are being simultaneously applied to terminals 38 and 39 and to the power amplifier 11, pulsing the power amplifier and stages 23, 28 and 33 of the multiplier. The pulses applied at terminals 38 and 39 are additional to the D.C. operating voltage applied from the D.C. source 37 and may consist of, for example, 400 volt pulses. Thus, terminal 38 during the pulsing periods has applied thereto a voltage of 120 volts (from the D.C. source) plus 400 volts (from the pulse generator), producing a total of 520 volts. Likewise, terminal 39 has applied thereto during the pulse period a D.C. voltage of, for example, 30 volts plus 400 volts from the pulse generator, producing a total of 430 volts. The higher voltages applied to terminals 38 and 39 are sufficient to raise the output of the multiplier at terminal 36 from of the order of 10 watts to of the order of 500 milliwatts. The further details of the circuitry of the multiplier and the stages thereof, as well as the rest of the equipment, is not further described herein since these details are obvious to those versed in the art and/or are conventional.

While there has been described the details of one system employing the present invention, it is obvious that numerous changes may be made with respect thereto without departing from the teachings of this invention. It is obvious that the power amplifier 11 may also include further multiplier stages. It is also obvious that a different number of multiplier stages may be employed in the source 3, and different types of amplifiers and triplers may be employed including those using other devices than electron discharge devices. Likewise, it will be obvious that the present invention may be employed with other systems than transponder, or other types of pulse repeater systems or other systems than interrogator systems. Numerous other changes within the spirit of the present invention will be obvious.

Accordingly, while I have described my invention above with reference to specific embodiments, it is to be understood that the invention is to be interpreted according to the state of the prior art and the appended claims.

I claim:

1. An electrical system comprising a radio frequency transmitter having an amplifier adapted to operate with a relatively high level input, a receiver having a mixer adapted to operate with a relatively low lever local oscillator input, an oscillator producing oscillations of a fundamental frequency, a frequency multiplier coupled to the output of said oscillator, means coupling the output of said multiplier to said amplifier, means coupling the output of said multiplier to said mixer, means for applying operating voltages of a given value to said multiplier to produce said low level output, and means for applying pulses of relatively higher operating voltages to said multiplier in addition to said voltages of said given value to produce said high level output.

2. An electrical system according to claim 1, wherein said frequency multiplier is multistaged, and said means for applying pulses to said multiplier includes means for applying said pulses to at least two stages.

3. An electrical system according to claim 2, wherein one stage of said multiplier includes a multi-element amplifying device having at least two separate elements to which operating voltages are applied, and said means for applying pulses to said multiplier includes means for applying the pulses simultaneously to both said elements.

4. An electrical system according to claim 1 wherein said frequency multiplier is multistaged, and includes at least one frequency multiplying stage and one amplifying stage, and said means for applying pulses to said multiplier includes means for applying pulses to both said stages.

5. An electrical system according to claim 1, wherein said multiplier includes a multi-element electron discharge device having at least two control elements and an anode element, and said means for applying pulses to said multiplier includes means for simultaneously applying pulses to the anode element and one of said control elements.

6. An electrical system according to claim 1, wherein said multiplier includes a push-pull stage having two amplifying devices arranged in push-pull, and said means for applying pulses to the multiplier includes means for applying the pulses simultaneously to both amplifying devices.

7. An electrical system comprising a radio frequency transmitter having an amplifier adapted to operate with a relatively high level input, a receiver having a mixer adapted to operate with a relatively low level local oscillator input, an oscillator producing oscillations of a fundamental frequency, a frequency multiplier coupled to the output of said oscillator, means coupling the output of said multiplier to said amplifier, means coupling the output of said multiplier to said mixer, means for applying operating voltages of a given value to said multiplier to produce said low level output, means for applying pulses of relatively higher operating voltages to said multiplier in addition to said voltages of said given value to produce said high level output, said amplifier being normally inoperative, and means for simultaneously applying operating pulses to said amplifier to pulse said amplifier.

References Cited in the file of this patent

UNITED STATES PATENTS

| | | |
|---|---|---|
| 1,912,387 | Seibert | June 6, 1933 |
| 2,344,813 | Goldstine | Mar. 21, 1944 |
| 2,402,606 | Davis | June 25, 1946 |
| 2,408,791 | Magnuski | Oct. 8, 1946 |
| 2,423,024 | Hershberger | June 24, 1947 |
| 2,433,669 | Keister | Dec. 30, 1947 |
| 2,512,300 | Braak | June 20, 1950 |
| 2,560,320 | Winkler | July 10, 1951 |
| 2,584,509 | Spencer | Feb. 5, 1952 |
| 2,671,850 | Marcon | Mar. 9, 1954 |
| 2,818,502 | Steward | Dec. 31, 1957 |